Aug. 9, 1960    P. G. HYKES ET AL    2,948,568
WHEEL DISK-RIM ASSEMBLY FOR TUBELESS TIRES
Filed Jan. 17, 1958

INVENTORS
Paul G. Hykes
Fred T. Roberts
John N. Bradley
BY Wm R. Glisson
ATTORNEY

United States Patent Office 2,948,568
Patented Aug. 9, 1960

2,948,568

WHEEL DISK-RIM ASSEMBLY FOR TUBELESS TIRES

Paul G. Hykes, Fred T. Roberts, and John N. Bradley, Grosse Pointe, Mich., assignors to The Budd Company, Philadelphia, Pa., a corporation of Pennsylvania Filed Jan. 17, 1958, Ser. No. 709,688

4 Claims. (Cl. 301—63)

This invention relates to a wheel disk-rim assembly for tubeless tires, which is also adapted to have tube-type tires mounted thereon, and has for an object the provision of improvements in this art.

One of the particular objects of the invention is to provide a drop center rim in which the drop center is not as deep as for integral-flange rims, thus allowing tires of small internal diameter to be used.

Another object is to provide a rim having tapered bead seats for the full width of both beads of the tire.

Another object is to provide a rim having a side extension beyond the bead-seat zone to receive a tire-securing side ring.

Another object is to provide a wide gutter in the side extension which has considerable width to accommodate side ring means of broad extent having great resistance to side overturning effects.

Another object is to provide a rim in which the connection between the wheel disk flange and the rim is made in the side extension which is outside the bead seat zone, leaving the entire rim area within the tire and its beads completely free from securing means, thus avoiding all possibility of leakage by reason of the securing means.

Another object is to provide annular raised portions at the inner sides of the tapered bead seats to resist the inward movement of the beads and to assist in preventing leakage, especially on sharp turns.

Another object is to provide an outwardly raised bulge or projection across the drop center of the rim to accommodate an axially disposed valve stem whereby the rim as a whole can be disposed nearer the brake drum and thus permit the use of a rim of smaller diameter than would otherwise be feasible.

The above and other objects and advantages of the invention will be apparent from the following description of an exemplary embodiment thereof shown in the accompanying drawings, wherein.

Figure 1:
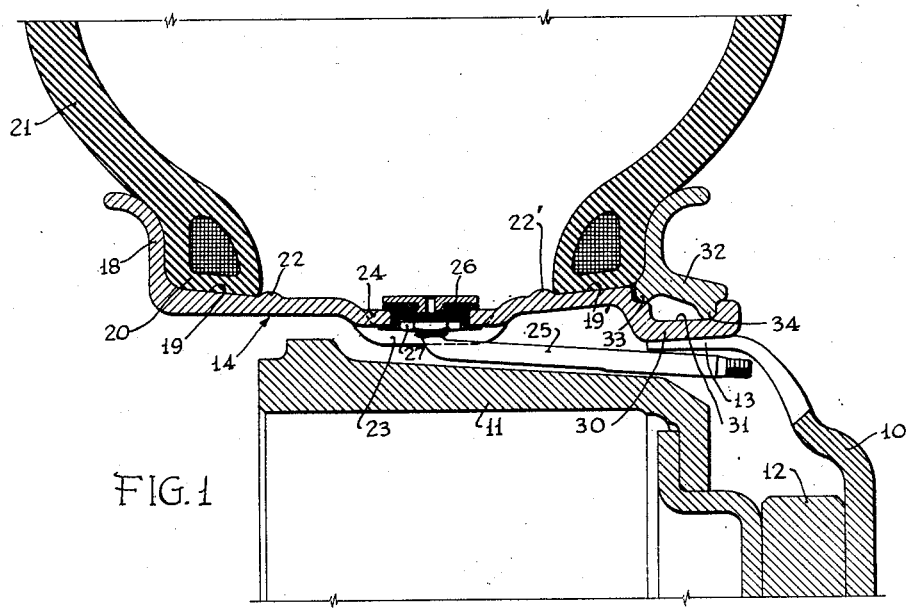
Fig. 1 is a radial axial section through a wheel disk, drum, rim and tire assembly embodying the invention.

As shown in the drawings, a wheel disk 10 and a brake drum 11 are secured to a wheel hub flange 12 by means not shown herein.

The disk 10 is provided with an axially aligned flange 13 to which a rim 14 is secured by suitable attaching means, here exemplified by rivets 15.

The rim is formed with an integral side flange 18 on one side and inside the flange has a tapered seat 19 for one of the beads 20 of a tire 21. The bead seat taper is about 5° more or less. Within the bead seat there is an annular rib 22 to aid in holding the tire bead outward.

At the intermediate portion the rim is provided with a drop center 23 which stands clear of the brake drum 11 and which at one point is bulged outward slightly, as at 24, to receive a valve stem assembly 25. The raised portion causes the valve stem to clear the brake drum. The valve stem is sealed by a rubber grommet 26 and is secured by a nut 27.

On the other side the rim is provided with a circumferential or annular rib 22' and a tapered bead seat 19' for the other tire bead.

Beyond the bead seat 19' the rim 14 has an axial extension 30 provided with a wide gutter 31 within which the rivets 15 are located, well away from the tire zone to avoid leakage due to the attachment of the rim to the disk flange.

An annular side ring 32 is seated on the rim extension, having feet 33 and 34 resting on the sides of the gutter. The outer foot 34 has an angular annular recess which rides on the corner of the gutter edge. The inner edge of the gutter has an angular annular recess in which the corner of the inner foot 33 seats. The great width and disposition of the base of the side ring provides great resistance to overturning of the side ring.

Figure 2:
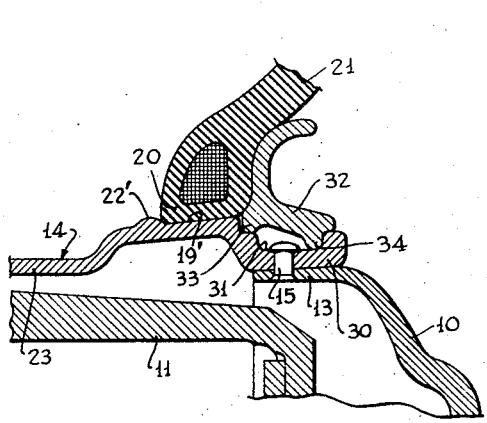
Fig. 2 is a partial radial axial section similar to Fig. 1 but taken at a different circumferential point to show the fastening means between the disk flange and rim.
Figure 3:
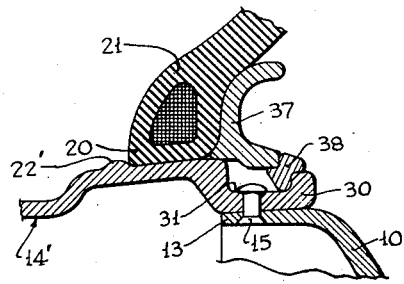
Fig. 3 is a view like Fig. 2 but showing a modified side ring assembly.

In the form shown in Figs. 1 and 2 the side ring is divided transversely to allow it to be inserted and removed. A somewhat more secure arrangement is shown in Fig. 3 wherein the side ring 37 is continuous and undivided transversely and of sufficient internal diameter to pass over the outer edge flange of the gutter 31 and slide at its inner edge along the top surface of the inner edge of the gutter on the rim 14'. A transversely divided locking ring 38 has angular annular recesses to ride the corners of the outer edge of the gutter and of the outer leg of the side ring 37. When the tire is uninflated the rings can be moved inward and outward axially by the amount needed for insertion and removal.

It is thus seen that the invention provides a simple, dependable and convenient assembly of wheel disk and rim with drop center and tapered bead seats for accomplishing the objects of the invention.

While two embodiments have been described for purposes of illustration, it is to be understood that there may be various embodiments within the general scope of the invention.

What is claimed is:

1. A wheel disk-rim assembly comprising in combination, a wheel disk provided with a peripheral axially extending flange, a rim having a drop center and on each side of the drop center having a tapered full-width bead seat for a tire bead, the bead seats each sloping upward radially in an axial direction away from the drop center, the higher outer side of the bead seat on the outer side being the highest part of the rim on that side, an integral side flange on the inner side of the rim beyond the bead seat on that side, an axially directed extension on the outer side of the rim beyond the bead seat on that side, said extension having a wide gutter with its bottom locatde radially below the outer edge of the rim at the bead seat and approximately even radially with the bottom of the drop center, said extension also having an outer flange disposed radially below the outer edge of the rim at the bead seat, means securing the disk flange to the rim extension at the bottom of the gutter, and tire-retaining side ring means disposed wholly beyond the bead seat for retaining the tire on the rim-extension side, said side ring means having axially spaced elements supported by the extension on opposite sides of the gutter.

2. A wheel disk-rim assembly as set forth in claim 1, further characterized by the fact that said side ring means includes an inner circumferentially continuous side ring having a wide base spanning most of the width of the gutter and having a foot seated on the inner side of the gutter, and a circumferentially split locking ring having a foot seated on the outer side of the gutter, the locking ring having a seat supporting the axially outer edge of said continuous side ring.

3. A wheel disk-rim assembly as set forth in claim 1, further characterized by the fact that the drop center of the rim has an outward radial bulge and a corresponding space therebelow extending across the drop center at one point around the circumference to accommodate an axially disposed valve stem.

4. A wheel disk-rim assembly as set forth in claim 1 which further includes in combination, an annular rib on each side of the drop center and located at the inner edge of a tapered bead seat for holding the tire beads outward against said rim side flange and tire-retaining side ring means.

References Cited in the file of this patent

UNITED STATES PATENTS

| | | |
|---|---|---|
| 1,624,974 | Putnam | Apr. 19, 1927 |
| 1,958,973 | Nelson | May 15, 1934 |
| 1,961,095 | Baker | May 29, 1934 |
| 1,989,188 | Frank | Jan. 29, 1935 |
| 2,149,205 | Brink | Feb. 28, 1939 |
| 2,198,978 | Sauer | Apr. 30, 1940 |
| 2,357,000 | Hollerith | Aug. 29, 1944 |
| 2,685,907 | Waddell | Aug. 10, 1954 |

FOREIGN PATENTS

| | | |
|---|---|---|
| 131,197 | Austria | Jan. 10, 1933 |
| 1,127,463 | France | Aug. 13, 1956 |